United States Patent
Mochar et al.

(10) Patent No.: US 11,609,577 B2
(45) Date of Patent: Mar. 21, 2023

(54) METHOD FOR DEFINING A FUNCTION EXISTENCE OF ACTIVATED FUNCTIONS IN A FUNCTIONAL UNIT AND FUNCTIONAL UNIT OPERABLE ACCORDING TO THE METHOD

(71) Applicant: Audi AG, Ingolstadt (DE)

(72) Inventors: Patrick Mochar, Ingolstadt (DE); Christoph Grasser, Beilngries (DE); Erich Schall, Vohburg (DE)

(73) Assignee: AUDI AG, Ingolstadt (DE)

( * ) Notice: Subject to any disclaimer, the term of this patent is extended or adjusted under 35 U.S.C. 154(b) by 228 days.

(21) Appl. No.: 16/753,101

(22) PCT Filed: Apr. 12, 2019

(86) PCT No.: PCT/EP2019/059382
§ 371 (c)(1),
(2) Date: Apr. 2, 2020

(87) PCT Pub. No.: WO2019/211080
PCT Pub. Date: Nov. 7, 2019

(65) Prior Publication Data
US 2020/0293061 A1    Sep. 17, 2020

(30) Foreign Application Priority Data
May 4, 2018    (DE) .................. 10 2018 206 880.1

(51) Int. Cl.
*G06Q 20/00*    (2012.01)
*G05D 1/02*    (2020.01)
(Continued)

(52) U.S. Cl.
CPC .......... *G05D 1/0276* (2013.01); *B60R 25/01* (2013.01); *B60R 25/24* (2013.01);
(Continued)

(58) Field of Classification Search
CPC ...... G05D 1/0276; B60R 25/01; B60R 25/24; G06F 16/2379; G06F 16/27;
(Continued)

(56) References Cited

U.S. PATENT DOCUMENTS 5,790,664 A * 8/1998 Coley .................... G06F 21/125
709/203
10,657,288 B2   5/2020 Sellschopp
(Continued)

FOREIGN PATENT DOCUMENTS

CN    107851166 A    3/2018
DE    10212259 A1    5/2003
(Continued)

OTHER PUBLICATIONS

International Search Report and Written Opinion of the International Searching Authority directed to related International Patent Application No. PCT/EP2019/059382, dated Jun. 7, 2019, with attached English-language translation; 18 pages.
(Continued)

*Primary Examiner* — Dante Ravetti
(74) *Attorney, Agent, or Firm* — Sterne, Kessler, Goldstein & Fox P.L.L.C.

(57) ABSTRACT

The present disclosure relates to a method for determining a functional inventory of a functional unit, wherein in the functional unit at least one function that has already been installed can be enabled and thus activated in each case and/or at least one function can be subsequently installed and so that it can be activated in each case and wherein the functional inventory of the functional unit represents the set of functions that are actually activated. The current functional inventory of the functional unit is determined by a control device of the functional unit and an actual inventory specification is generated for the current functional inventory
(Continued)

tory, which describes the determined functional inventory, and in an external server device, a target inventory specification relating to a target functional inventory is requested from a predetermined blockchain credit account and in the event that the determined actual inventory specification differs from the target inventory specification, a predetermined forcing measure for predetermining the target functional inventory is triggered.

16 Claims, 2 Drawing Sheets

(51) Int. Cl.
```
G06F 16/27      (2019.01)
G06F 16/23      (2019.01)
B60R 25/01      (2013.01)
B60R 25/24      (2013.01)
G06F 21/12      (2013.01)
G06F 21/62      (2013.01)
G06Q 20/12      (2012.01)
G06Q 30/018     (2023.01)
```
(52) U.S. Cl.
CPC .......... *G06F 16/2379* (2019.01); *G06F 16/27* (2019.01); *G06F 21/121* (2013.01); *G06F 21/629* (2013.01); *G06Q 20/127* (2013.01); *G06Q 30/0185* (2013.01); *G06F 2221/0713* (2013.01); *G06Q 2240/00* (2013.01)

(58) Field of Classification Search
CPC ................. G06F 21/121; G06F 21/629; G06F 2221/0713; G06Q 20/127; G06Q 30/0185; G06Q 2240/00; H04L 2209/38; H04L 63/102

USPC ................................. 705/16, 21; 380/44, 262
See application file for complete search history.

(56) References Cited

U.S. PATENT DOCUMENTS

| | | | |
|---|---|---|---|
| 2016/0147542 A1* | 5/2016 | Kishi | G06F 9/4418 713/2 |
| 2016/0259923 A1 | 9/2016 | Papa et al. | |
| 2017/0046652 A1 | 2/2017 | Haldenby et al. | |
| 2017/0279774 A1 | 9/2017 | Booz et al. | |
| 2018/0018723 A1 | 1/2018 | Nagla et al. | |
| 2019/0058910 A1* | 2/2019 | Solow | H04N 21/4627 |

FOREIGN PATENT DOCUMENTS

| | | |
|---|---|---|
| DE | 102009025585 A1 | 12/2010 |
| DE | 102013021867 A1 | 6/2015 |
| DE | 102016007472 A1 | 12/2017 |

OTHER PUBLICATIONS

"Over-the-Air Software Update," Uconnect Frequently Asked Questions, Jul. 25, 2017, available at: https://www.navigation.com/static/WFS/Shop-ChryslerNA-Site/-/Shop-ChryslerNA/en_US/Documents/Over-the-Air%20Software%20Update%20FAQ_25-July-17(2).pdf.
Weintraub, Seth: "How to Update your Chevy Bolt firmware via USB so Android Auto and Google Assistant work beautifully," Jan. 12, 2018, available at: https://electrek.co/2018/01/12/update-chevy-bolt-ev-firmware/.
International Preliminary Report on Patentability directed to related International Patent Application No. PCT/EP2019/059382, completed Feb. 14, 2020, with attached English-language translation; 13 pages.

* cited by examiner

METHOD FOR DEFINING A FUNCTION EXISTENCE OF ACTIVATED FUNCTIONS IN A FUNCTIONAL UNIT AND FUNCTIONAL UNIT OPERABLE ACCORDING TO THE METHOD

TECHNICAL FIELD

The present disclosure relates to a method for determining or specifying a functional inventory of active functions in a functional unit. At least one function can be subsequently enabled and/or reinstalled in the functional unit, so that the inventory of activated functions of the functional unit can be changed. The present disclosure also includes a functional unit with a changeable functional inventory.

BACKGROUND

Such a functional unit is known, for example, from DE 10 2009 025 585 A1, where a motor vehicle is described as the functional unit. To enable a function, it is usually necessary to pay for this function from the manufacturer of the functional unit or the supplier of the function. This is called function-on-demand functionality. However, since the functions can already be preinstalled and only the activation is necessary, for example, by means of an activation code, users always try to circumvent the safeguarding of the preinstalled function in a functional unit in order to enjoy a preinstalled function free of charge. Since more and more functions are installed in the vehicle and are not activated/enabled immediately, but are only activated afterwards with subsequent payment, there is a constant race between the manufacturers who try to safeguard the non-activated functions against circumvention of the admissibility condition (e.g., the purchase and/or the activation code) and those users (i.e., hackers) who try to circumvent the safeguards without payment. This is possible because no additional hardware is required to activate a function so that a function can be performed online and digitally, i.e., without physical contact, for example, in a workshop.

This omission of the transfer of physical components increases the risk that such functions will be activated due to hacker attacks circumventing the intended admissibility conditions, as described above, e.g., purchase and/or activation code, so that a user does not pay for them and nevertheless uses them.

It is known from DE 10 2013 021 867 A1 that by activation of functions, a motor vehicle can be personalized in such a way that the functional inventory of activated functions is determined or set depending on which user is currently using the motor vehicle. To do this, the user must log on to an Internet server when using the motor vehicle. A functional inventory assigned to the user is then set in the motor vehicle. The functional unit thus has those functions for which the user has previously paid. However, this approach is designed to be very centralized on an Internet server, so that if several functions from different manufacturers are to be used, this can lead to cumbersome administration in the central server.

It is known from DE 10 2016 007 472 A1 that vehicle data can be stored in a public, decentralized blockchain in order to store this vehicle data in a tamper-proof manner. For example, the mileage and the location can be stored as vehicle data. Since the blockchain can no longer be manipulated afterwards, a mileage as shown on the speedometer of the motor vehicle can be compared with the mileage in the blockchain in order to detect a manipulation to reduce the mileage. In this way, the used car trade can be protected against manipulation. However, this method does not protect the safeguarding of a preinstalled function against unauthorized activation.

BRIEF DESCRIPTION OF DRAWINGS/FIGURES

DETAILED DESCRIPTION

Figure 1:
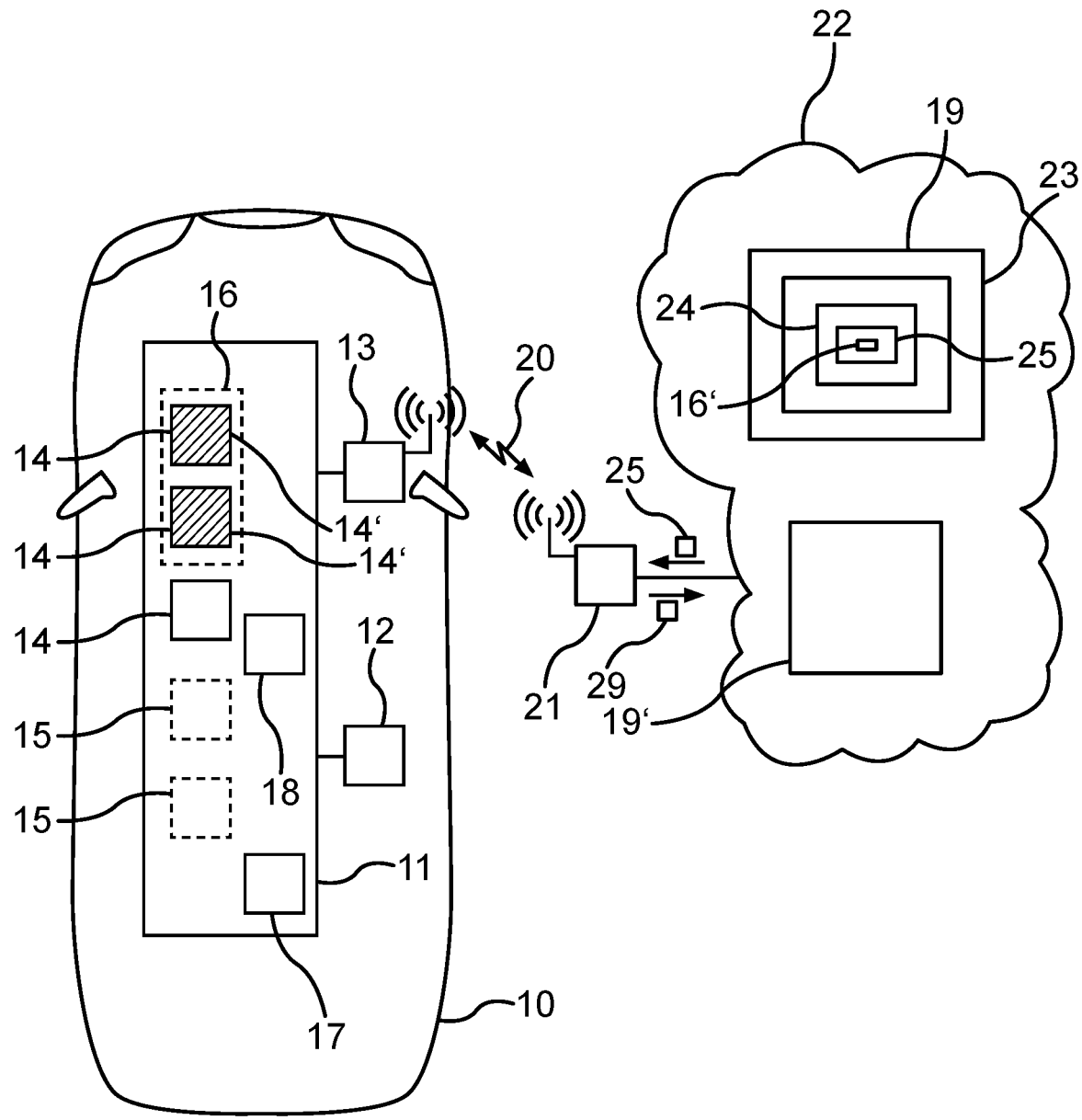
FIG. 1 shows a schematic representation of a functional unit, in accordance with some embodiments.

The object of the present disclosure is to control the activation of such a function in a functional unit whose functional inventory of activated functions can be changed by activation and/or reinstallation.

The object is achieved by the subject matters of the independent claims. Advantageous developments of the present disclosure are described by the dependent claims, the following description and the drawing figures.

The present disclosure according to some embodiments provides a method for defining or setting a functional inventory of the activated functions of a functional unit. The method assumes that at least one function that has already been installed can be enabled in the functional unit and/or that at least one function can be reinstalled. By way of a non-limiting example, the functional unit is set up in such a way that at least one function that has already been installed is activated and/or at least one function is reinstalled. Corresponding storage space can therefore be provided for the reinstallation. The respective function is enabled by activation and by reinstallation. A function activated in this way can then be used by a user in the functional unit or is made available to the user. A non-activated function cannot be used by a user in the functional unit. The set of functions that are actually activated, that is to say that can be used by the user in the functional unit or are made available to the user, is referred to below as the functional inventory.

In some embodiments, in the method, the current functional inventory is determined at least once (i.e., once or repeatedly) by a control device of the functional unit and a description, which is referred to here as the actual inventory specification and which describes the determined functional inventory, is generated for the current functional inventory. The control device queries an external server device, for example, an Internet server, from a predetermined blockchain credit account for a target inventory specification relating to a target functional inventory. "External" here and hereinafter means "outside the functional unit." Thus the target inventory specification describes the functional inventory which should actually be present in the functional unit, namely the target functional inventory. In the event that the determined actual inventory specification differs from the target inventory specification, a predetermined forcing measure for specifying or setting the target functional inventory is triggered. The functional unit thus responds to a deviation of the actual inventory specification from the target inventory specification with the forcing measure. Since the target inventory specification is stored in a blockchain credit account, only an authorized control device and/or only an authorized person, who in each case provides the so-called private cryptographic key (private key) for the blockchain credit account, can change the content of the blockchain credit account. Thus, the target inventory specification can only be manipulated if the private key is used.

In some embodiments, the target functional inventory of the functional unit can be determined via a blockchain credit account and can be forced or predetermined in the functional unit. Only those who have access to manipulation of the blockchain credit account using the private key can change the target inventory specification and thus can set or define the target functional inventory. Since the blockchain credit account is provided outside the functional unit, full control over the functional unit is of no use for manipulating the functional inventory thereof. For example, a credit account in one of the following blockchains can be used as a blockchain credit account, for example, bitcoin, etherium, and/or lightcoin, etc. In the event that the functional unit is a motor vehicle, at least one of the following can be checked, for example, as a function in relation to the respective activation, for example, a matrix function of a matrix headlight, a driver assistance program, a navigation assistant, an avatar assistant, an internet browser, and/or an engine control program, etc.

In some embodiments, by way of a non-limiting example, at least once, a device-specific, user-independent target inventory specification is requested from a blockchain credit account of the functional unit as the target inventory specification. In other words, a target functional inventory is forced or predetermined, which is predetermined or defined, for example, by the manufacturer of the functional unit regardless of who the user is or who uses the functional unit. This has the advantage that an original manufacturing state of the functional unit and/or a state of the functional unit, as was produced by a certified workshop, can be guaranteed. Device manipulation is thus prevented. Accordingly, a liability risk for the manufacturer can be reduced. The blockchain credit account can then, for example, only be changed by the manufacturer and/or the certified workshop, i.e., the described private key is then only owned by the manufacturer and/or the certified workshop. For example, in the event that the functional unit is a motor vehicle, an overload due to manipulation of an engine control program and thus a corresponding liability case can be prevented.

In some embodiments, by way of a non-limiting example, at least once, a user-specific target inventory specification, which is unbound with respect to the functional unit, i.e., valid for a plurality of functional units, is requested from a blockchain credit account of a user of the functional unit as target inventory specification. In other words, it is checked which target functional inventory the user is entitled to for the functional unit because it is a target functional inventory that belongs to the user and/or was paid for by the user. For example, a subscription model can be implemented in this way. The method thus provides the user with the functional inventory that has been validated or predetermined in accordance with the target inventory specification. If the user changes from a first device to a second device, the target functional inventory can be reversed or deactivated in the first device and can be activated or set in the second functional unit that the user is currently using. The user is thus provided with his personal target functional inventory in accordance with the target inventory specification in at least two different functional units, namely each time he uses the respective functional unit.

In some embodiments, the above-mentioned forcing measure provides that, if it is recognized that a new function, not included in or excluded from the target inventory specification, has been enabled and/or installed in the functional unit and thus activated in each case, by way of a non-limiting example, this new function or the (entire) current functional inventory or even the operation of the functional unit is blocked or deactivated. In some cases, deactivating only the new function itself ensures that the functional unit can continue to be used with the target functional inventory that is validated by the target inventory specification. Deactivating the entire current functional inventory, however, deactivates the entire function-on-demand functionality. However, this then maintains a basic functionality or basic functionality of the functional unit that is not part of the function-on-demand functionality. By deactivating or blocking the operation of the entire device, the user can no longer use the functional unit. This guarantees a safe state of the functional unit.

In some embodiments, in addition or as an alternative to the described deactivation, when the new function is identified, a message regarding an inadmissible activation of the new function and/or regarding the new function itself can be sent to a predetermined, external receiving point. Such a receiving point can be, for example, an internet server from the device manufacturer and/or an internet server from the function manufacturer. This ensures that in the event of a claim, for example a guarantee or a claim for damages, the respective manufacturer is already informed about the manipulation of the functional unit.

In some embodiments, in the event that a new function previously excluded from the current functional inventory of the functional unit is enabled and/or newly installed and thus activated in compliance with a predetermined admissibility condition, an updated target inventory specification is also generated for this purpose and is saved in the blockchain credit account. The blockchain credit account is therefore updated or adapted to the expanded or reduced functional inventory. The admissibility condition defines when a function is admissibly activated. For example, the admissibility condition can check whether a predetermined activation code for the new function has been provided or entered in the functional unit. If the activation code is admissible, the admissibility condition is met. The blockchain credit account then reflects the new functional inventory through the saved new target inventory specification. Thus, when the functional inventory is checked again, the new function is accepted and the described deactivation of the new function by the forcing measure does not occur.

In some embodiments, by way of a non-limiting example, the forcing measure is carried out only when a predetermined idle state of the functional unit is recognized. Such an idle state can exist, for example, when the functional unit is in a standby mode. In other words, it is ensured that a user is not currently using the functional unit. In the case of a motor vehicle, the idle state can be, for example, a parking state in which the motor vehicle is parked, that is to say in particular a drive unit of the motor vehicle is switched off. This has the advantage that a change in the functional inventory, such as takes place, for example, through the described deactivation, does not surprise a user by the changed behavior of the functional unit.

In some embodiments, the generation of the actual inventory specification and/or the querying of the target inventory specification are performed not only once, but repeatedly at predetermined points in time. At least one point in time arises if an online connection of the control device determines that it can reach the external server device for the blockchain credit account via the Internet and/or if the functional unit is put into operation during each commissioning and/or if a predetermined time interval has passed after a predetermined time period in each case and/or if a random function produces a predetermined result sporadically. If at least one function is operated without authorization in the functional unit, this may be recognized at the latest the next time an online connection is established and/or the next time the device is started up and/or after the predetermined time interval has elapsed and/or unpredictably for the user according to the random function. As a result, a user cannot obtain a function by once overcoming the securing of the function without payment or without generally meeting the admissibility condition.

In some embodiments, the actual inventory specification and the target inventory specification are each provided as a hash value, for example, a checksum. The hash value is generated for a respective function list. This function list specifies the function designations of the activated functions according to the current functional inventory for the actual inventory specification and according to the target functional inventory for the target inventory specification. The use of a hash value or a checksum has the advantage that checking a single value is sufficient to check the entire functional inventory of the functional unit. Correspondingly little data would have to be exchanged between the blockchain credit account and the control device of the functional unit.

In some embodiments, as stated above, the method can be used for different device types, for example, a motor vehicle, a smartphone, a tablet PC, a smart watch, and/or a personal computer. With these device types, the use of the function-on-demand functionalities may be provided with regard to the hardware equipment. These types of devices can thus be protected against circumvention of the described admissibility condition by the method according to the embodiments as described herein.

In some embodiments, a functional unit is disclosed. The functional unit is set up to carry out the method according to the embodiments as described herein. The functional unit is therefore set up in such a way that at least one function that has already been installed is enablable or can be enabled and/or that at least one function is retrofittable or can be retrofitted. Thus at least one function, in each case, is activatable or can be activated. The functional inventory of the functional unit represents the set of functions actually activated in the manner described herein. The functional inventory is, therefore, the set of activated functions available from the point of view of the user of the functional unit. The control device is designed to carry out an embodiment of the method according to the embodiments as described herein. For this purpose, by way of a non-limiting example, the control device described for carrying out the method steps can be implemented in the functional unit. The control device can be designed as a program code for a processor device of the functional unit. Thus the functional unit can have a processor device, which, for example, can have at least one microprocessor and/or at least one microcontroller. A program code can be provided, which has program instructions which, when executed by the processor device, carry out the embodiment of the method. By way of a non-limiting example, the program code may be stored in a data memory of the processor device.

In some embodiments, the functional unit may be designed as a motor vehicle, for example, as a motor car, a passenger car, or a truck. By way of a non-limiting example, the functional unit can, however, also be designed as a smartphone, a tablet PC, a smart watch, or a personal computer, etc. However, the functional unit can also be, for example, a software product, i.e., an application software product, a server service, or internet service, etc.

The features of the described embodiments can be combined with each other.

Exemplary embodiments of the present disclosure are described below with reference to the drawings.

The embodiments explained below are the exemplary embodiments in which the components of the embodiments each constitute individual features to be considered independently of each other and also to be considered in a combination that is different from the combination described. In addition, the embodiments described may also be supplemented by further features of the present disclosure which have already been described.

In the figures, the same reference numerals designate elements that have the same function.

FIG. 1 shows a schematic representation of a functional unit, in accordance with some embodiments. FIG. 1 shows a functional unit 10, which may be a motor vehicle, for example. The functional unit shows a processor device 11, an operating device 12 and a communication device 13, which can each be provided, for example, in the functional unit 10. The functional unit 10 can have at least one pre-installed function 14 and/or can provide or allow at least one retroactively installable function 15. The functions 14, 15 can each be software functions or program code-based functions that can be implemented or provided by the processor device 11. For this purpose, the processor device 11 can comprise at least one microprocessor and/or at least one microcontroller. The processor device 11 can be implemented, for example, by a control device or by a combination of several control devices. A user of the functional unit 10 can use the functions 14, 15 in the event that they are activated, that is to say they are actually installed in the functional unit 10 and are also enabled. For example, the user can use the control device 12 in each case to select a function and initiate its execution. For this purpose, the operating device 12 can be designed in a manner known per se, for example, can have a touchscreen and/or at least one button. However, not all of the preinstalled functions 14 actually have to be activated or enabled. This results in a functional inventory 16 of the functions 14' that are actually enabled and thus activated. If a function 15 that can be installed later is actually installed and then activated, this also belongs to the functional inventory 16.

So that a function is activated and thus belongs to the functional inventory 16, it can be provided that the user must pay for the respective function or must buy it. The function unit, for example, the processor device, can use a predetermined admissibility condition 17 to check whether a function has been admissibly activated, which may include or provide for verification of an activation code, for example.

If a user tries to activate a function and thus expand the functional inventory 16 without actually paying for this function, the admissibility condition 17 for this function is violated.

In the functional unit 10, this is recognized by means of a method, which is described below in connection with FIG. 1 and FIG. 2. The method can be carried out by a control device 18, which can be implemented in the functional unit 10, for example, by means of the processor device 11. The method can use the communication device 13. The communication device 13 can use, for example, a mobile radio module and/or a Wireless Local Area Network (WLAN) radio module. A communication link to an external server device 19 can be provided by means of the communication device. The communication link can, for example, provide a radio link 20 between the communication device 13 and an external communication device 21, for example a mobile radio network or a WLAN router. The radio link 20 represents an online connection. The server device 19 can be part of the Internet 22. The server device 19 can provide or operate a blockchain 23, which can be part of a public, decentralized blockchain system, for example for a cryptographic currency (for example bitcoin or etherium or lightcoin). A blockchain credit account 24 can be managed by the blockchain 23. It can be a blockchain credit account 24 for the functional unit 10 or for a user of the functional unit 10. A target inventory specification 25 relating to a target functional inventory 16' can be stored in the blockchain credit account 24.

Another server device 19' is shown, which represents a receiving point.

Figure 2:
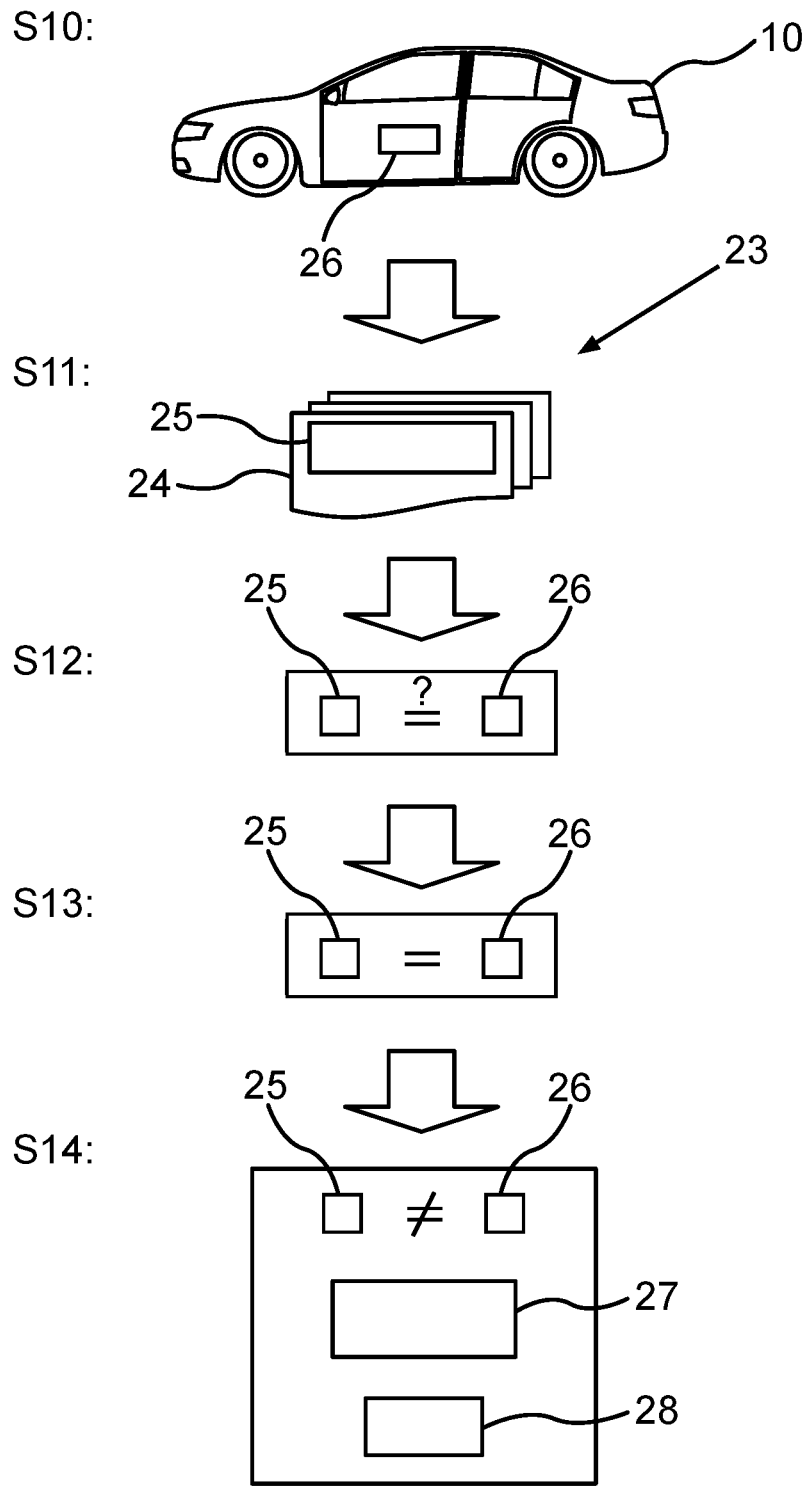
FIG. 2 shows a flowchart of a method carried out using the functional unit as shown in FIG. 1, in accordance with some embodiments.

FIG. 2 shows a flowchart of a method carried out using the functional unit as shown in FIG. 1, in accordance with some embodiments. In FIG. 2, it is shown symbolically that the control device 18 can generate an actual inventory specification 26 for the current, actual functional inventory 16 of the functional unit 10 in a step S10. This can be a function list of the active functions or a hash value which can represent this function list. The blockchain credit account 24 can be identified in the blockchain 23 in a step S11 and the target inventory specification 25 relating to the target functional inventory 16' can be read or requested from the blockchain credit account 24.

In a step S12, the actual inventory specification 26 and the target inventory specification 25 can be compared. If, for example, a hash value is used as the respective inventory specification, these two hash values can be compared.

It can be determined in a step S13 that the two inventory specifications such as target inventory specification 25 and actual inventory specification 26 match. Then the functional unit 10 can be used without further restriction.

If, on the other hand, it is determined in a step S14 that the actual inventory specification is different from the target inventory specification, an optional additional check can be made to determine whether the user has enabled an additional function 14 and/or has newly installed an additional function 15. If this is not the case, a forcing measure 27 can be initiated in step S14. This can consist, for example, in that a function that is not bought by the user or is generally activated according to the admissibility condition 17 is deactivated. In the functional unit 10, this prevents a new function that is not activated according to the admissibility condition 17 from being used.

However, the method can also be used to assist a user in adapting the functional unit 10 to a target functional inventory 16', as can be provided in a blockchain credit account 24 of the user independently of the functional unit, that is to say for several different functional units. A target functional inventory 16' of the functions permissible by the user in a plurality of functional units can thus be stored in the blockchain credit account 24 of the user as the target inventory specification 25. The same target functional inventory 16' can be provided for each of the functional units. Thus, the functional unit 10 is then automatically adapted to the user by the method. The forcing measure 27 can provide that according to the target inventory specification 25 at least one preinstalled function 14 is activated and/or at least one is deactivated and/or at least one new function is newly installed. The user therefore always finds the same target functional inventory 16' in each of the different functional units that he uses and, for example, with which he logs in, according to the target inventory specification 25.

Thus, for example, automatically generated target inventory specification 25, for example, a target hash value, which describes the delivery status or the functional scope of the functional unit purchased, is saved or stored in a blockchain credit account 24. Due to the concept of blockchain technology, this target inventory specification 25, for example, the target hash value, cannot be manipulated or can only be manipulated with considerable effort. If a new function-on-demand product is acquired for the functional unit 10, that is to say a preinstalled function 14 is enabled and/or an installable function 15 is newly installed, an updated target inventory specification 25, for example, an updated target hash value is automatically generated and stored in the blockchain credit account 24.

According to the method, the functional unit 10 then generates, at predetermined time intervals or at predetermined points in time, for example, a defined time interval and/or an online connection as soon as possible, an actual inventory specification 26, for example, an actual hash value, by which all functions currently enabled and activated in the functional unit 10 are described as a functional inventory 16. This actual inventory specification 26 can then be compared with the target inventory specification 25.

If there is a discrepancy between these inventory specifications, the impermissible, unauthorized functions are deactivated, for example, forcing measure 27 according to one embodiment. For security reasons, the deactivation is preferably carried out only in an idle state 28 of the functional unit 10. In the motor vehicle, for example, this can be a stationary state. The control device 18 then preferably sends a message 29 to the server device 19', for example of the manufacturer of the functional unit. All relevant items, which function differs, time stamp, to name just examples, can be included in the notification. It can then be checked whether an impermissible or unauthorized function is actually used by the functional unit 10 and, for example, legal steps are initiated in the event of an actual violation of the admissibility condition 17.

An inventory specification can contain, for example, an identification number of the functional unit, for example, a vehicle identification number VIN. Thus, this is then an inventory specification related to the functional unit. The blockchain credit account 24 is then a credit account specific to the functional unit. However, it can also be provided that the target inventory specification 25 relates to a user and thus the blockchain credit account 24 is a user-related account. The target inventory specification 25 then indicates, for example, in the context of a subscription model, e.g., subs model, all functions which the user can use in different functional units and for which he has already paid once. However, he can also replace or change the functional unit 10 for another functional unit and is then supported in the provision of the target functional inventory 16' in the new functional unit. The functions specified in accordance with the subscription or generally in the blockchain credit account 24 in accordance with the target functional inventory 16' can be activated in the functional unit used in each case.

This means that it does not matter which functional unit the user is using, i.e., which motor vehicle he is getting into, for example, because he will still receive the provided or activated target functional inventory 16' for which he has paid for the current time period, for example, providing a matrix headlight function. The user only has to log on to the functional unit. If, on the other hand, using the same functional unit another user who has not booked or paid for this target functional inventory 16' is registered with the functional unit, the functional inventory is deactivated when used by this user in the functional unit by the forcing measure.

The blockchain technology thus enables the use of function-on-demand in functional units, such as motor vehicles, to be tamper-proof. This makes it difficult to manipulate. This thus prevents unpaid use of a function.

In addition, for example, in the context of a short-term rental, for example, in the case of a vehicle rental, the user, as the renter of the functional unit, can verify ad hoc and thus activate an additional function that has been booked. The validity of an item of equipment can be verified for a specific time window by means of the target inventory specification 25.

By using a hash value in each case as the inventory specification, the amount of data to be sent for the verification or checking of the functional inventory 16 is minimal or small.

In conclusion, it should be mentioned that the method thus has two aspects. On the one hand, the aspect of, in the vehicle business, securing function-on-demand functionality, which can be used for motor vehicles and all machines or generally functional units that are handed over in a certain delivery state and/or can be modified afterwards, and the aspect relating to customer or user data for personalization of the functional inventory 16 for a user.

Overall, the examples show how the present disclosure can ensure function-on-demand functionality via blockchain technology.

The invention claimed is:

1. A method, comprising:
   determining, by a control device of a functional unit, a functional inventory of the functional unit based on an inventory specification, wherein the functional unit is a motor vehicle, device, mobile phone, or software product, wherein the functional inventory is a set of activated functions available from the functional unit, and wherein the inventory specification includes a hash value;
   accessing, by the control device, a blockchain credit account, wherein the blockchain credit account is a credit account specific to the functional unit;
   determining, by the control device, that the blockchain credit account has been accessed;
   requesting, by the control device, via the accessed blockchain credit account, a target inventory specification associated with a target functional inventory from an external server device, wherein the target inventory specification includes a hash value;
   receiving, by the control device, via the accessed blockchain credit account, the requested target inventory specification from the external server device;
   comparing, by the control device, the hash value of the inventory specification with the hash value of the target inventory specification;
   based on a determination, by the control device, that the comparing of the hash value of the inventory specification with the hash value of the target inventory specification is different, triggering a predetermined forcing measure for specifying the target functional inventory, wherein the triggered predetermined forcing measure comprises deactivation of a new function;
   determining, by the control device, that the new function is excluded from the target inventory information and is enabled in the inventory specification or the new function is installed or activated in the functional unit based on the triggered predetermined forcing measure;
   based on a determination, by the control device, that the new function is excluded from the target inventory information and is enabled in the inventory specification or the new function is installed or activated in the functional unit based on the triggered predetermined forcing measure, generating a message regarding an inadmissible activation of the new function to send to an external receiving point; and
   deactivating, by the control device, the functional unit based on the message generated and the triggered predetermined forcing measure.

2. The method of claim 1, wherein the functional unit is a motor vehicle.

3. The method of claim 1, further comprising:
   activating at least one function installed in the functional unit or subsequently installed in the functional unit that can be enabled.

4. The method of claim 1, wherein the set of activated functions is reinstalled.

5. The method of claim 1, further comprising:
   requesting, from the external server device, the target inventory specification corresponding to the functional unit using the blockchain credit account that is associated with the functional unit.

6. The method of claim 1, further comprising:
   requesting, at least once, the target inventory specification that is valid for a plurality of functional units from a blockchain credit account of a user of the functional unit.

7. The method of claim 1, further comprising:
   deactivating the new function in response to determining that the new function is excluded from the target inventory information and is enabled in the inventory specification or the new function is installed or activated in the functional unit based on the triggered predetermined forcing measure.

8. The method of claim 1, further comprising:
   updating the target inventory specification stored in the blockchain credit account in response to determining that the new function previously excluded from the inventory specification is enabled, installed, or activated in compliance with a predetermined admissibility condition.

9. The method of claim 1, further comprising:
   triggering the predetermined forcing measure in response to detecting a state of the functional state is idle.

10. The method of claim 1, further comprising:
    generating the inventory specification repeatedly at predetermined points in time including at least one point in time occurring upon determining an online connection exists, upon determining the functional unit is put into operation, upon determining that a predetermined time interval has passed, and/or upon determining a predetermined result is generated by a specific function.

11. The method of claim 1, further comprising:
    requesting the target inventory specification repeatedly at predetermined points in time including at least one point in time occurring upon determining an online connection exists, upon determining the functional unit is put into operation, upon determining that a predetermined time interval has passed, and/or upon determining a random function generated a predetermined result.

12. The method of claim 1, wherein the inventory specification or the target inventory specification is a hash value that is generated for a respective function list.

13. A functional unit, comprising:
a processor; and
a communication device,
wherein the processor is configured to perform operations comprising:
- determining a functional inventory of the functional unit based on an inventory specification, wherein the functional unit is a motor vehicle, device, mobile phone, or software product, wherein the functional inventory is a set of activated functions available from the functional unit, and wherein the inventory specification includes a hash value;
- accessing a blockchain credit account, wherein the blockchain credit account is a credit account specific to the functional unit;
- determining that the blockchain credit account has been accessed;
- requesting, via the accessed blockchain credit account, a target inventory specification associated with a target functional inventory from an external server device, wherein the target inventory specification includes a hash value;
- receiving, via the accessed blockchain credit account, the requested target inventory specification from the external server device;
- comparing the hash value of the inventory specification with the hash value of the target inventory specification;
- based on a determination, by the processor, that the comparing of the hash value of the inventory specification with the hash value of the target inventory specification is different, triggering a predetermined forcing measure for specifying the target functional inventory, wherein the triggered predetermined forcing measure comprises deactivation of a new function;
- determining that the new function is excluded from the target inventory information and is enabled in the inventory specification or the new function is installed or activated in the functional unit based on the triggered predetermined forcing measure;
- based on a determination, by the processor, that the new function is excluded from the target inventory information and is enabled in the inventory specification or the new function is installed or activated in the functional unit based on the triggered predetermined forcing measure, generating a message regarding an inadmissible activation of the new function to send to an external receiving point; and
- deactivating the functional unit based on the message generated and the triggered predetermined forcing measure.

14. The functional unit of claim 13, wherein the operations further comprise:
activating at least one function installed in the functional unit or subsequently installed in the functional unit that can be enabled.

15. The functional unit of claim 13, wherein the set of activated functions is reinstalled.

16. The functional unit of claim 13, wherein the functional unit is a motor vehicle.

* * * * *